Aug. 11, 1964     C. L. SMADER     3,144,572
TERMINAL CONSTRUCTION FOR ELECTRIC MOTORS
Filed March 26, 1962     2 Sheets-Sheet 1
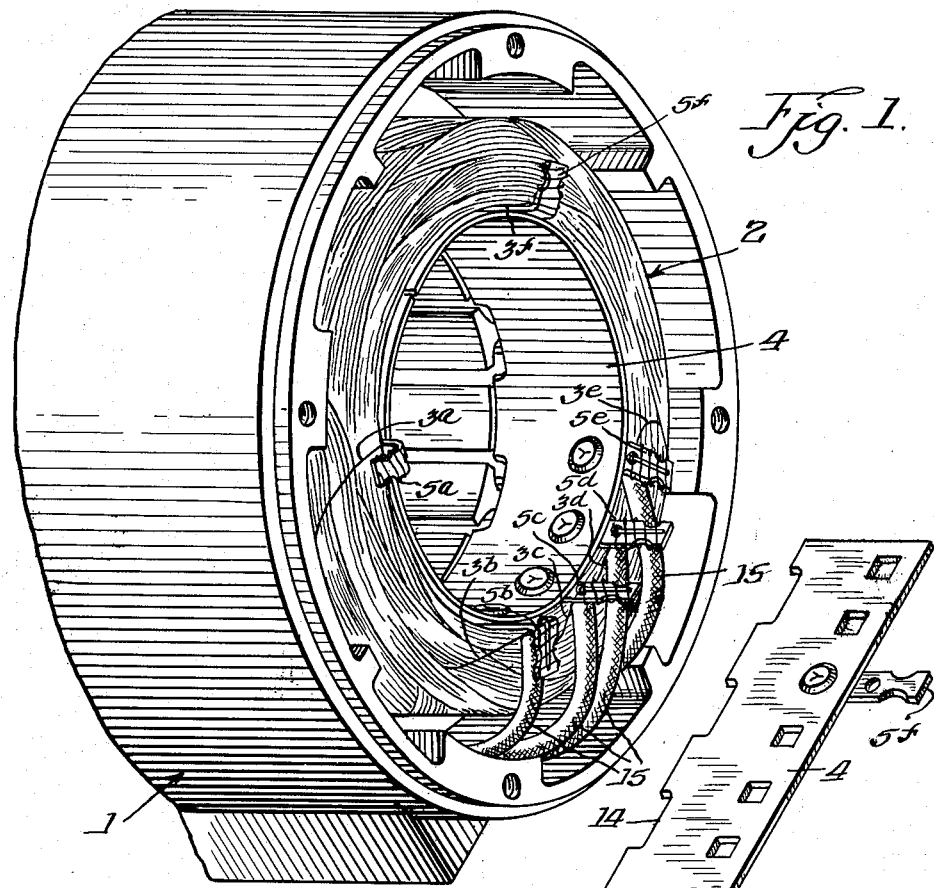
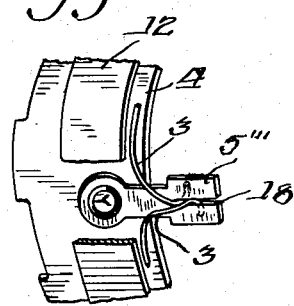
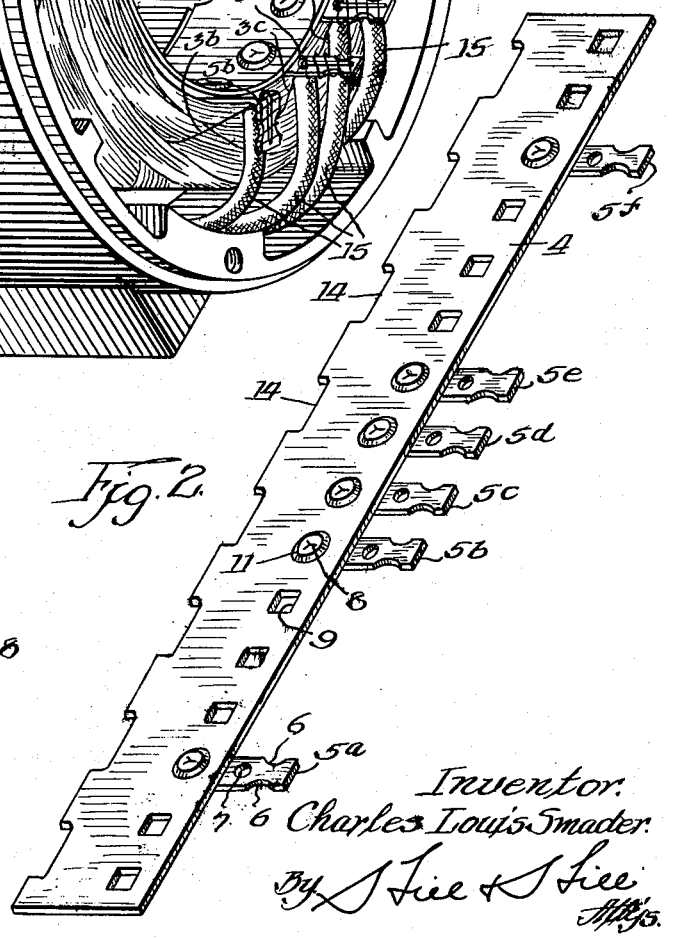
Inventor.
Charles Louis Smader
By Lee & Lee Aug. 11, 1964  C. L. SMADER  3,144,572
TERMINAL CONSTRUCTION FOR ELECTRIC MOTORS
Filed March 26, 1962  2 Sheets-Sheet 2
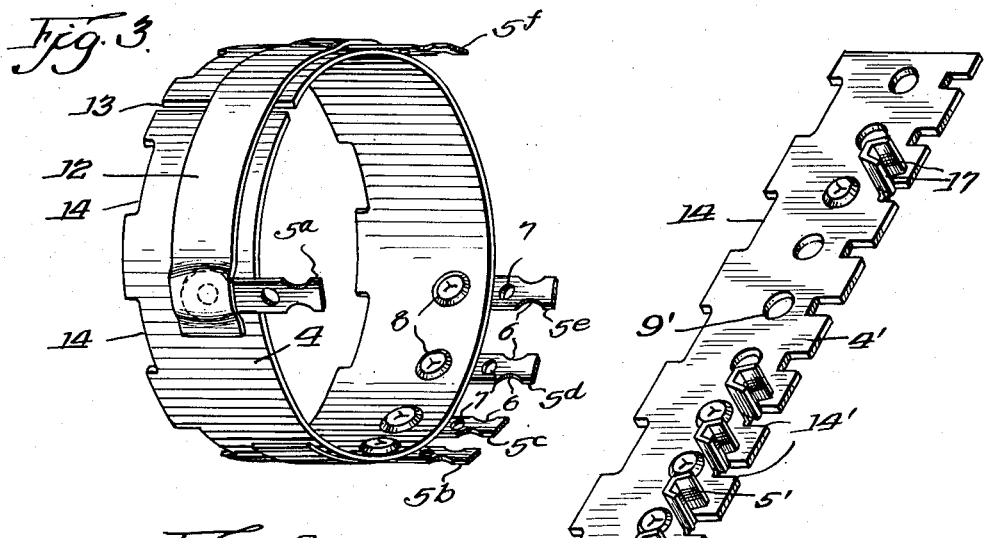
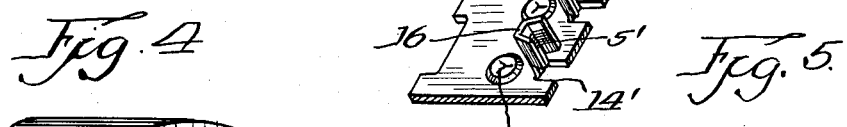
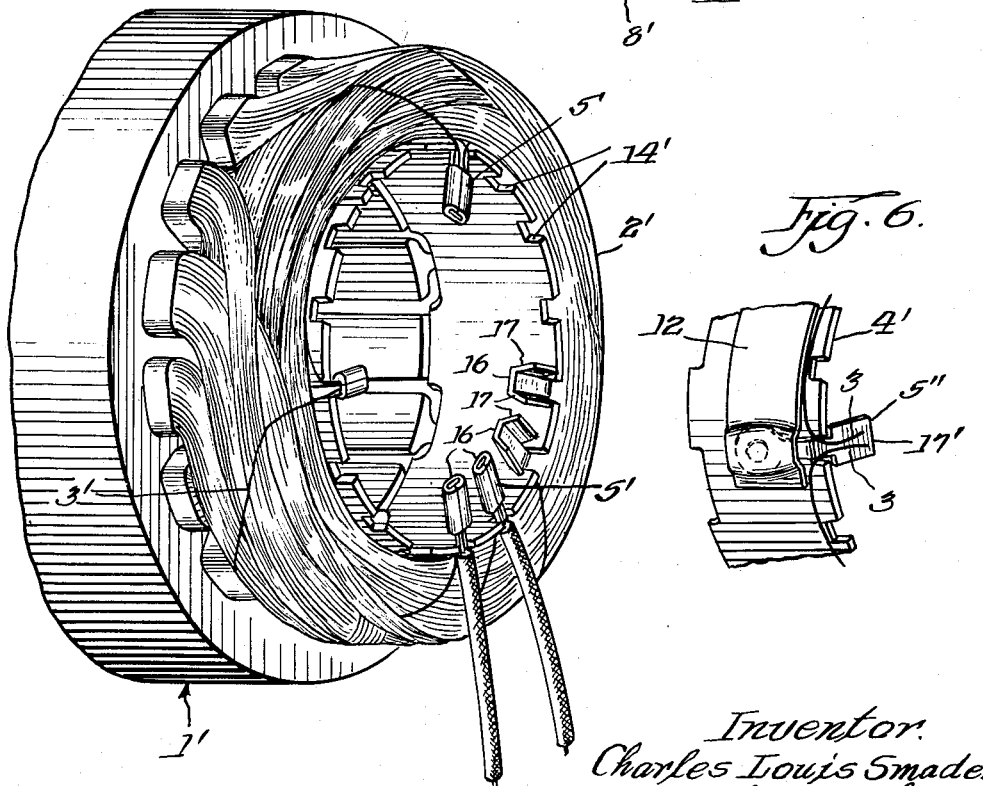
Inventor.
Charles Louis Smader.
By
Attys.

United States Patent Office 3,144,572
Patented Aug. 11, 1964

3,144,572
TERMINAL CONSTRUCTION FOR
ELECTRIC MOTORS
Charles Louis Smader, 825 Arthur Ave., Racine, Wis.
Filed Mar. 26, 1962, Ser. No. 182,276
12 Claims. (Cl. 310—71)

The invention relates generally to electric motor constructions and the like, and more particularly to an anchoring structure for the coil leads to the field windings.

The invention has among its objects the production of a terminal structure which is exceedingly simple in construction and which may be readily embodied in a motor structure to provide a rigid anchor for the ends of the field windings of the motor as well as the anchoring of the lead wires from the power source to such field windings.

Another object of the invention is the production of such a coil lead anchor which is so designed that it readily adapts itself for use with various types of fastening means, as for example, welding operations, or dip soldering techniques whereby all of the coil leads to the windings may be soldered in a single dipping operation.

A further object of the invention is the production of such a coil lead anchor structure which is so designed that all connections are visible and may be readily checked and corrected as necessary, the various leads if desired, being readily capable of visible identification, facilitating checking and testing of the windings.

A further object of the invention is the production of such an anchoring structure which is so designed that it may be readily adjustable to variations in the number of terminals required as well as the positioning and relationship of the terminals.

A further object of the invention is the production of such an anchoring structure which readily lends itself to automation and in which the leads are securely anchored, permitting the use of air dry varnishes and the like, thereby eliminating, by means of a very simple, inexpensive structure, time consuming operations heretofore requiring much tedious labor.

Many other objects and advantages of the construction herein shown and described will be obvious to those skilled in the art from the disclosure herein given.

In the drawings wherein like reference characters indicate like or corresponding parts:

FIG. 1 is a perspective view of an end portion of the housing and field windings of an electric motor illustrating the assembly therewith of an anchor structure constructed in accordance with the present invention;

FIG. 2 illustrates one embodiment of the invention comprising a flexible insulating strip, prior to its fabrication into a tubular arrangement;

FIG. 3 is a perspective view of the strip illustrated in FIG. 2 following its formation into a tubular shape;

FIG. 4 is a view similar to FIG. 1, illustrating another embodiment of the invention;

FIG. 5 is a perspective view similar to FIG. 2 of the embodiment illustrated in FIG. 4;

FIG. 6 illustrates another form of terminal structure which may be employed with the invention; and FIG. 7 illustrates another terminal structure which may be employed.

The present invention contemplates the utilization of a tubular member of suitable insulating material which is adapted to carry a plurality of terminal elements, the tubular member being adapted to be concentrically disposed with respect to the coil winding with which it is to be employed, the anchoring structure being disposed within the end portions of the coil windings as illustrated in the drawings, or in some cases may be disposed at the exterior of the coils in concentric relation with respect thereto. The terminals are so disposed on the insulating member that the connection of the wires thereto, including the soldering or other anchoring steps, may be readily performed thereon, the resulting structure firmly and effectively maintaining the connections in rigid relationship.

Referring to the drawings and more particularly to FIGS. 1, 2 and 3, the reference numeral 1 indicates generally the housing of an electric motor structure which contains a plurality of field coils indicated generally by the numeral 2, having leads 3a–3f.

Disposed within the end portions of the coils 2, in concentric relation therewith, is a tubular shaped body member 4 constructed of suitable insulating material, the member 4 in the particular embodiment illustrated comprising a flat strip as illustrated in FIG. 2 provided with a plurality of terminals 5a to 5f, one for each of the leads 3. The terminals 5 illustrated are of standard construction, having end portions provided with notches 6 therein and having an aperture 7 adjacent the body portion 4. Each terminal is attached to the body portion 4 by a transversely extending mounting portion 8 which is extended through respective openings 9, illustrated as being of square configuration, in the body portion 4 and suitably swaged to provide a head 11 which rigidly locks the terminal to the body portion.

As illustrated in FIG. 3, following the attachment of the terminals to the body, the latter may be flexed into a tubular shape as illustrated in FIG. 3 and secured in such relation by suitable means such as a strip 12 of insulating material which is adapted to at least partially encircle the body portion 4 and bridge the joint between the ends of the body member, the strip 12 also serving as an insulating member for the outer portion of the terminals 5. The tubular body portion so formed is constructed of a diameter to enable its snug positioning within the windings 2 and if desirable may be provided with notches 14 in the longitudinal edge of the strip opposite to that carrying the terminals 5 if deemed desirable, the notches facilitating the circulation of air as well as accommodating adjacent portions of the motor structure or windings in some installations and also enabling the winding to be laced with cord to produce a solid rigid mass.

In the employment of the invention in the fabrication of a motor, the structure is first fabricated as described, the resulting structure illustrated in FIG. 3 being disposed in operative position within the motor structure and the leads 3 of the coils suitably connected to the terminals, as for example, by wrapping the lead wires around the terminals at the notched portions thereof in the accepted manner. The lead wires 15 may then be brought to the corresponding terminals and secured thereto, such leads being brought through the openings 7 in the terminals and soldered thereto. The terminals 5 preferably initially extend parallel to the axis of the motor structure as illustrated for the terminals 5c and 5d, in which position they may be readily dipped simultaneously into a solder bath whereby the leads connected thereto may be soldered and following the soldering action the end portions of the terminals may be bent radially outward similar to the terminals 5a, b, e and f. As illustrated, the terminals may be employed for connecting the leads from several windings, as for example, the terminals 5a and 5f or may be employed for connecting external leads such as the leads 15 secured to the terminals 5b, c, d and e.

If desired, the strip material forming the body 4 may be preformed with the openings 9 therein at regularly spaced intervals as well as the notches 14 if employed, so that in use the strip material may be readily cut to the desired length for the particular motor involved and the terminals 5 mounted thereon at the most suitable point with respect to the leads which are to be attached thereto.

It will be obvious that while I have illustrated the member 4 as being disposed within the end portions of the windings 2, in some cases it may be desirable to dispose the terminal member at the exterior of such windings, the terminal structure being concentrically disposed between the end portions of the windings 2 and the oppositely disposed portions of the housing 1.

FIGS. 4 and 5 illustrate a modified form of the invention wherein the terminal elements are designed for mechanical securement of the lead wires thereto by a clinching operation or the like. In this construction the terminal members 5' extend through notches 15 formed in the adjacent edge of the strip 4', the wire receiving portion 16 extending transversely to the plane of the strip 4' and having outwardly extending wing portions 17. The terminals 5' may be secured to the strip by rivet means similar to that illustrated in connection with the previous construction adapted to extend through the openings 9' in the strip and suitably swaged or otherwise formed with heads 8'. The strip 4' may be arranged in a tubular configuration and secured by a tape 12 in the same manner as the construction illustrated in FIG. 3, and following insertion of the structure within the windings 2' of the motor 1', the leads 3' may be disposed between the wing portions 17 and the latter crimped therearound to form a suitable connection therebetween.

FIG. 6 illustrates still a further modification of terminal structure wherein a terminal board 4' corresponding to that illustrated in FIG. 5 may be employed, the terminals being similar to that illustrated in FIG. 5 but provided with a flat face 17 on which the leads 3 may be disposed and secured thereto by a welding operation. To facilitate such an operation the terminal may be bent inwardly similar to the terminals 5' illustrated in FIG. 4, whereby one electrode of the welder may be inserted through the housing and field windings into engagement with the inner face of the terminal, following which the leads may be contacted by the other contact element of the electrode welder.

In the modification of FIG. 7, the terminal 5''' may be mounted on a body member 4 corresponding to the member illustrated in FIG. 1, the terminal being similar to that illustrated in FIG. 1, but provided with a longitudinally extending slot 18 therein instead of the notches 6 and aperture 7, the notch 18 being proportioned to readily receive and frictionally engage the lead wires 3 so that the latter may be drawn into the slot and thereby retained until completion of the soldering operation which, as in the case of the construction illustrated in FIG. 1, may comprise a suitable dipping operation.

The constructions illustrated in FIGS. 2, 6 and 7 are particularly adapted for use with relatively small gauge wires, while the construction of FIGS. 4 and 5 is very effective where the lead wires are of relatively heavy gauge and not readily bent or twisted.

It will be apparent from the above description that I have provided a very simple yet highly efficient anchoring structure for coil leads of electric motors and the like which readily adapts itself to a wide variety of terminal construction as well as facilitates the utilization of dipping operations and the like or other operations which may be employed in automated assembly operations.

It will also be particularly noted that the invention enables the firm anchoring of the coil leads both from the coils themselves as well as external lead wires, resulting in a very efficient arrangement which provides visual inspection as well as simple checking and testing techniques.

Having thus described my invention, it is obvious that various immaterial modifications may be made in the same without departing from the spirit of my invention; hence I do not wish to be understood as limiting myself to the exact form, construction, arrangement and combination of parts herein shown and described, and more particularly pointed out in the claims.

What I claim as new and desire to secure by Letters Patent is:

1. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, said tubular-shaped body member formed from a flat strip of flexible insulating material, said strip being of a length to be flexed into a tubular configuration, and said terminals disposed along one longitudinal edge of the strip and the opposite longitudinal edge of the latter provided with spaced notches for cooperation with portions of the motor structure on which the anchor is adapted to be mounted.

2. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, said tubular-shaped body member formed from a flat strip of flexible insulating material, said strip being of a length to be flexed into a tubular configuration, and said terminals extending longitudinally outward in an axial direction from a peripheral edge of the tubular-shaped body member in the assembled position thereof with respect to the end portions of the field coils concentric therewith and adapted for connecting the lead wires of the field coils thereto in current conducting relationship.

3. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, said tubular-shaped body member formed from a flat strip of flexible insulating material, said strip being of a length to be flexed into a tubular configuration, and said strip secured in tubular configuration by a strip of insulating material connecting the ends of said strip and overlying adjacent exposed portions of said terminals to protect the terminals.

4. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, said tubular-shaped body member formed from a flat strip of flexible insulating material, said strip being of a length to be flexed into a tubular configuration, and said flat strip preformed with regularly spaced apertures whereby terminals may be mounted in any selected apertures.

5. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, and said terminals extend parallel to the axis of said tubular-shaped body member outwardly beyond the adjacent end edge of the tubular-shaped body member whereby they are accessible for dip soldering to secure the coil leads thereto.

6. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, said terminals extend parallel to the axis of said tubular-shaped body member outwardly beyond the adjacent end edge of the tubular-shaped body member whereby they are accessible for dip soldering to secure the coil leads thereto, and said terminals are bendable, whereby they may be bent following soldering of the coil leads thereto providing radially extending portions of the terminal overlying the end portions of the field coils contiguous thereto.

7. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, said strip preformed with regularly spaced apertures, and said terminals are provided with wing elements adapted to be mounted in any selected apertures and to extend radially inwardly therethrough and to be mechanically crimped around the lead wires to be anchored.

8. A coil lead anchor for electric motors and the like comprising a generally tubular-shaped body member of insulating material including a plurality of termnials mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, said strip preformed with regularly spaced apertures, and said terminals adapted to be mounted in any selected apertures to extend radially inward and have face portions adapted to receive the lead wires to be anchored with opposite faces of each terminal being accessible to welding means for welding such lead wires to the terminals.

9. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, and said terminals are each provided with a longitudinally extending slot therein which opens on the free end of the terminal and constructed to receive and frictionally engage said lead wires.

10. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, and said terminals including end portions provided with notches adjacent respective face ends thereof, and said end portions provided with an aperture contiguous to said tubular-shaped body portion and adapted to receive its respective lead wire.

11. A coil lead anchor for electric motors and the like comprising a generally tubular-shaped body member of insulating material including a plurality of terminals mounted thereon, said tubular-shaped body member being of a size to be disposed in concentric relation with respect to the end portions of the field coils of such a motor with said terminals disposed adjacent said end portions at the outermost edge of said tubular-shaped body member and forming relatively rigid anchors for the lead wires to said coils, said tubular-shaped body member formed from a flat strip of flexible insulating material, said strip being of a length to be flexed into a tubular configuration, said flat strip preformed with regularly spaced apertures therein, and said terminals disposed along one longitudinal edge of the strip and mounted in any selected apertures and the opposite longitudinal edge of the latter provided with spaced notches for cooperation with portions of the motor structure on which the anchor is adapted to be mounted.

12. An electric motor including a stationary coil member, field coils including lead wires operatively associated with the stationary coil member, a coil lead anchor comprising a generally tubular-shaped body member of insulating material including a plurality of terminals mounted thereon, said tubular-shaped body member being of a size to be disposed in concentric relation with respect to the end portions of the field coils and contiguous to the inner periphery of the end portions of the field coils with said terminals disposed adjacent said end portions at the outermost edge of said tubular-shaped body member and forming relatively rigid anchors for the lead wires of said coils, said tubular-shaped body member formed from a flat strip of flexible insulating material and of a length to be flexed into said tubular-shaped body member, said strip secured in tubular configuration by a strip of insulating material connecting the ends of said strip and overlying adjacent exposed portions of said terminals to protect the terminals, said terminals disposed along one longitudinal edge of the flat strip of flexible insulating material providing the tubular-shaped body member and the opposite longitudinal edge of the tubular-shaped body member provided with spaced notches for cooperation with portions of the motor structure on which the anchor is mounted, and said flat strip of flexible insulating material preformed with regularly spaced apertures therein so that said terminals are mounted in pre-selected apertures.

References Cited in the file of this patent

UNITED STATES PATENTS

| | | |
|---|---|---|
| 2,627,584 | Schultz | Feb. 3, 1953 |
| 2,801,354 | Donahoo | July 30, 1957 |